(12) United States Patent
Ross, Sr.

(10) Patent No.: US 6,182,612 B1
(45) Date of Patent: Feb. 6, 2001

(54) CAT CABINET

(76) Inventor: Thomas R. Ross, Sr., 3041 Octagon Ave., Sinking Spring, PA (US) 19608

( * ) Notice: Under 35 U.S.C. 154(b), the term of this patent shall be extended for 0 days.

(21) Appl. No.: 09/353,964

(22) Filed: Jul. 15, 1999

(51) Int. Cl.[7] .............................. A01K 1/03; A47B 81/00
(52) U.S. Cl. .................... 119/482; 119/501; 119/161; 312/285; 312/265.6; 312/237
(58) Field of Search .................. 119/482, 483, 119/484, 485, 496, 498, 499, 501, 500, 161, 163, 165, 428, 429, 431, 487, 491, 492, 493, 494; 312/283, 285, 265.6, 259, 293.2, 237

(56) References Cited

U.S. PATENT DOCUMENTS

| | | | |
|---|---|---|---|
| 3,872,832 | * | 3/1975 | Quinn .................................. 119/165 |
| 4,021,975 | * | 5/1977 | Calkins ................................. 52/64 |
| 4,624,380 | * | 11/1986 | Wernette ............................ 119/168 |
| 5,050,536 | * | 9/1991 | Baker .................................. 119/499 |
| 5,320,065 | * | 6/1994 | Leopold ............................. 119/498 |
| 5,349,924 | * | 9/1994 | Hooper, Jr. .......................... 119/496 |
| 5,544,958 | * | 8/1996 | McAfee .............................. 312/237 |
| 5,572,951 | * | 11/1996 | Evans et al. ......................... 119/168 |
| 5,738,040 | * | 4/1998 | Simmons ............................ 119/165 |
| 5,749,317 | * | 5/1998 | Richey et al. ...................... 119/166 |
| 5,769,026 | * | 6/1998 | Kohn ................................... 119/165 |

* cited by examiner

Primary Examiner—Michael J. Carone
Assistant Examiner—James S. Bergin

(57) ABSTRACT

A cat cabinet for providing a location for a cat to go for various reasons including to hide, to eat and to use a litter box. The cat cabinet includes a housing with an open top, a bottom panel and a perimeter side wall upwardly extending around the bottom panel. The perimeter side wall includes a spaced apart pair of end panels, and a spaced apart pair of side panels extending between the end panels. A top panel substantially covers the open top of the housing. A shelf is disposed in the housing and spaced above the bottom panel. A first of the side panels has a plurality of access doors pivotally coupled thereto to provide access into the housing through the first side panel. The perimeter side wall also has a plurality of removable punchouts which form corresponding passage holes through the perimeter side wall when separated from the perimeter side wall.

9 Claims, 1 Drawing Sheet

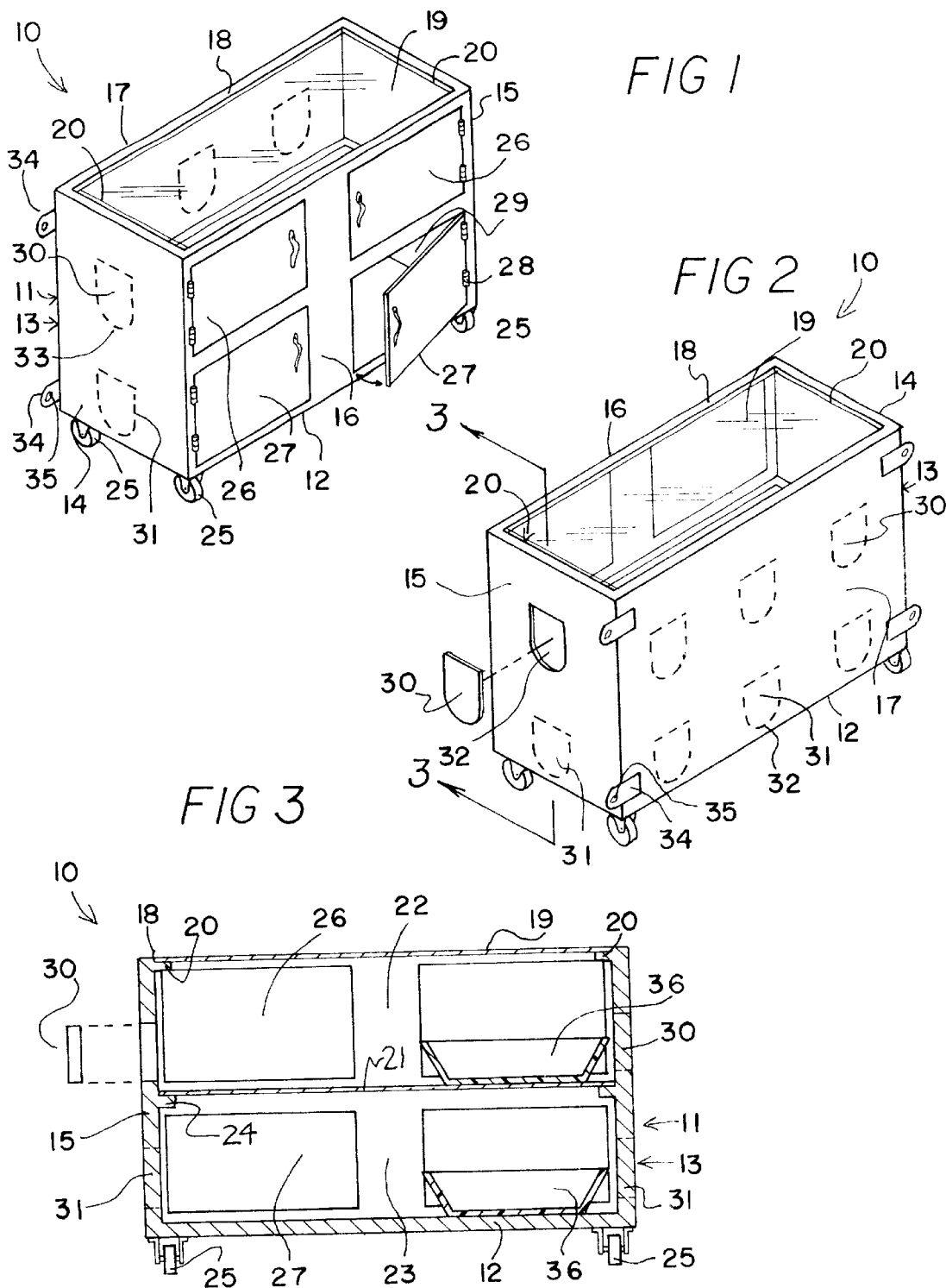

CAT CABINET

BACKGROUND OF THE INVENTION

1. Field of the Invention

The present invention relates to cat cabinets and houses and more particularly pertains to a new cat cabinet for providing a location for a cat to go for various reasons including to hide, to eat and to use a litter box.

2. Description of the Prior Art

The use of cat cabinets and houses is known in the prior art. More specifically, cat cabinets and houses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,544,958; U.S. Pat. No. 5,769,026; U.S. Pat. No. 5,050,536; U.S. Pat. No. 5,738,040; U.S. Pat. No. 4,021,975; and U.S. Pat. No. 3,872,832.

While these devices fulfill their respective, particular objectives and requirements, the aforementioned patents do not disclose a new cat cabinet. The inventive device includes a housing with an open top, a bottom panel and a perimeter side wall upwardly extending around the bottom panel. The perimeter side wall includes a spaced apart pair of end panels, and a spaced apart pair of side panels extending between the end panels. A top panel substantially covers the open top of the housing. A shelf is disposed in the housing and spaced above the bottom panel. A first of the side panels has a plurality of access doors pivotally coupled thereto to provide access into the housing through the first side panel. The perimeter side wall also has a plurality of removable punchouts which form corresponding passage holes through the perimeter side wall when separated from the perimeter side wall.

In these respects, the cat cabinet according to the present invention substantially departs from the conventional concepts and designs of the prior art, and in so doing provides an apparatus primarily developed for the purpose of providing a location for a cat to go for various reasons including to hide, to eat and to use a litter box.

SUMMARY OF THE INVENTION

In view of the foregoing disadvantages inherent in the known types of cat cabinets and houses now present in the prior art, the present invention provides a new cat cabinet construction wherein the same can be utilized for providing a location for a cat to go for various reasons including to hide, to eat and to use a litter box.

The general purpose of the present invention, which will be described subsequently in greater detail, is to provide a new cat cabinet apparatus and method which has many of the advantages of the cat cabinets and houses mentioned heretofore and many novel features that result in a new cat cabinet which is not anticipated, rendered obvious, suggested, or even implied by any of the prior art cat cabinets and houses, either alone or in any combination thereof.

To attain this, the present invention generally comprises a housing with an open top, a bottom panel and a perimeter side wall upwardly extending around the bottom panel. The perimeter side wall includes a spaced apart pair of end panels, and a spaced apart pair of side panels extending between the end panels. A top panel substantially covers the open top of the housing. A shelf is disposed in the housing and spaced above the bottom panel. A first of the side panels has a plurality of access doors pivotally coupled thereto to provide access into the housing through the first side panel. The perimeter side wall also has a plurality of removable punchouts which form corresponding passage holes through the perimeter side wall when separated from the perimeter side wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cat cabinet apparatus and method which has many of the advantages of the cat cabinets and houses mentioned heretofore and many novel features that result in a new cat cabinet which is not anticipated, rendered obvious, suggested, or even implied by any of the prior art cat cabinets and houses, either alone or in any combination thereof.

It is another object of the present invention to provide a new cat cabinet which may be easily and efficiently manufactured and marketed.

It is a further object of the present invention to provide a new cat cabinet which is of a durable and reliable construction.

An even further object of the present invention is to provide a new cat cabinet which is susceptible of a low cost of manufacture with regard to both materials and labor, and which accordingly is then susceptible of low prices of sale to the consuming public, thereby making such cat cabinet economically available to the buying public.

Still yet another object of the present invention is to provide a new cat cabinet which provides in the apparatuses and methods of the prior art some of the advantages thereof, while simultaneously overcoming some of the disadvantages normally associated therewith.

Still another object of the present invention is to provide a new cat cabinet for providing a location for a cat to go for various reasons including to hide, to eat and to use a litter box.

Yet another object of the present invention is to provide a new cat cabinet which includes a housing with an open top, a bottom panel and a perimeter side wall upwardly extending around the bottom panel. The perimeter side wall includes a spaced apart pair of end panels, and a spaced apart pair of side panels extending between the end panels. A top panel substantially covers the open top of the housing. A shelf is disposed in the housing and spaced above the bottom panel. A first of the side panels has a plurality of access doors pivotally coupled thereto to provide access into the housing through the first side panel. The perimeter side wall also has a plurality of removable punchouts which form corresponding passage holes through the perimeter side wall when separated from the perimeter side wall.

Still yet another object of the present invention is to provide a new cat cabinet that may have wheels to permit rolling to different locations.

Even still another object of the present invention is to provide a new cat cabinet that may help prevent odors from a litter box from spreading through a dwelling.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic first perspective view of a new cat cabinet according to the present invention.

FIG. 2 is a schematic second perspective view of the present invention opposite that illustrated in FIG. 1.

FIG. 3 is a schematic cross sectional view of the present invention taken from line 3—3 of FIG. 2.

DESCRIPTION OF THE PREFERRED EMBODIMENT

With reference now to the drawings, and in particular to FIGS. 1 through 3 thereof, a new cat cabinet embodying the principles and concepts of the present invention and generally designated by the reference numeral 10 will be described.

As best illustrated in FIGS. 1 through 3, the cat cabinet 10 generally comprises a housing with an open top, a bottom panel and a perimeter side wall upwardly extending around the bottom panel. The perimeter side wall includes a spaced apart pair of end panels, and a spaced apart pair of side panels extending between the end panels. A top panel substantially covers the open top of the housing. A shelf is disposed in the housing and spaced above the bottom panel. A first of the side panels has a plurality of access doors pivotally coupled thereto to provide access into the housing through the first side panel. The perimeter side wall also has a plurality of removable punchouts which form corresponding passage holes through the perimeter side wall when separated from the perimeter side wall.

In closer detail, the cat cabinet includes a generally rectangular housing 11 having a generally rectangular open top, a generally rectangular bottom panel 12 and a perimeter side wall 13 upwardly extending around the bottom panel. The perimeter side wall comprises a spaced apart pair of generally rectangular end panels 14,15, and a spaced apart pair of generally rectangular side panels 16,17 extending between the end panels. The perimeter side wall also has a generally rectangular upper edge 18 defining the periphery of the open top of the housing.

A generally rectangular top panel 19 substantially covers the open top of the housing. The top panel may comprise a translucent or transparent material to permit viewing into the housing and to also permit light to pass into the housing.

In one embodiment of the top panel, the end panels each may have an upper rest 20 inwardly extending into the housing, each of the upper rests is extended substantially across the distance between the side panels. The upper rests is positioned adjacently below the upper edge of the perimeter side wall. The top panel is rested on the upper rests. In one embodiment, the top panel may be rested on the upper rests so that a top surface of the top panel is coplanar with the upper edge of the perimeter side wall.

A substantially planar and generally rectangular shelf 21 is disposed in the housing and spaced above the bottom panel. The shelf divides the housing into upper and lower compartments. The upper compartment 22 is defined between the top panel and the shelf. The lower compartment 23 is defined between the bottom panel and the shelf. In use, each compartment is designed for receiving at least one cat therein.

The end panels each may have a lower rest 24 inwardly extending into the housing. Like the upper rests, each of the lower rests is extended substantially across the distance between the side panels. The lower rests is positioned between and spaced apart from the upper rests and the bottom panel. The shelf is rested on the lower rests to support the shelf above the bottom panel. The shelf, the top panel, and the bottom panel may lie in substantially parallel planes to one another.

In one embodiment, the bottom panel may have a plurality of ground engaging wheels 25 rotatably mounted thereto. In use, the wheels are designed for permitting rolling of the housing across a resting surface on which the wheels rest. In one such embodiment, each corner of the bottom panel has one of the wheels positioned thereadjacent for helping to enhance the stability of the housing when upright.

As best illustrated in FIG. 1, a first of the side panels has a plurality of generally rectangular access doors 26,27 pivotally coupled thereto by hinges 28 mounted to the outside of the first side panel. The access doors cover corresponding generally rectangular access openings 29 through the first side panel to provide access into the housing through the first side panel.

The plurality of access doors may comprise a pair of upper access doors 26 positioned towards the upper edge of the perimeter side wall and a pair of lower access doors 27 positioned towards the bottom panel. The upper access doors provide access into upper compartment while the lower access doors provide access into the lower compartment.

As best illustrated in FIG. 2, the perimeter side wall has a plurality of removable punchouts 30,31 which form corresponding passage holes 32 through the perimeter side wall when separated from the perimeter side wall. The passage holes each are sized to permit passage of a cat therethrough.

The plurality of punchouts may comprise a plurality of upper punchouts 30 and a plurality of lower punchouts 31. The upper punchouts are positioned towards the upper edge of the perimeter side wall to provide access into the upper compartment when removed. The lower punchouts are positioned towards the bottom panel to provide access into the lower compartment when removed.

In one embodiment, each of the end panels has one of the upper punchouts and one of the lower punchouts located thereon. In this embodiment, a second of the side panels has at least two of the upper punchouts and at least two of the lower punchouts located thereon.

Each of the punchouts has an outer perimeter and may also have a plurality of perforations 33 or other similar type of apertures through the perimeter side wall along the outer perimeter of the respective punchouts for aiding separation of the respective punchouts from the perimeter side wall.

In one embodiment the outer perimeter of each of the punchouts comprises a generally U-shaped lower portion and a substantially straight upper portion extending between spaced apart substantially straight side regions of the lower portion of the outer perimeter of the respective punchout. The lower portions of the outer perimeters of the punchouts each has a lower arcuate region has a convexity facing in a direction towards the bottom panel. This particular shape of the outer perimeter of the punchouts forming a corresponding shape for the outer periphery of the passage hole formed by removal of the particular punchout which is advantageous for permitting a cat to comfortably pass into the housing via the passage holes.

In one embodiment, the second side panel may also have a plurality of mounting brackets 34 coupled thereto. A first pair of the mounting brackets are outwardly extended from one of the end panels and a second pair of mounting brackets are outwardly extended from the other of the end panels. The mounting bracket each have a mounting hole 35 therethrough designed for extending a fastener therethrough to secure the mounting brackets to a structure such as a post or a wall surface to secure the housing in a stationary location.

In use, a pair of litter boxes 36 may be disposed in the housing with one of the litter boxes disposed in the upper compartment and resting on the shelf and the other of the litter boxes disposed in the lower compartment and resting on the bottom panel. Cat food, and other cat accessories may also be provided in each compartment.

In an illustrative embodiment, the housing may have a height defined between the top and bottom panels of about 42 inches, a length defined between the end panels of about 48 inches and a width defined between the side panels of about 19 inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cat cabinet, comprising:
    a housing having an open top, a bottom panel and a perimeter side wall upwardly extending around said bottom panel;
    said perimeter side wall comprising a spaced apart pair of end panels, and a spaced apart pair of side panels extending between said end panels;
    a top panel substantially covering said open top of said housing;
    a shelf being disposed in said housing and spaced above said bottom panel;
    a first of said side panels having a plurality of access doors pivotally coupled thereto to provide access into said housing through said first side panel; and
    said perimeter side wall having a plurality of removable punchouts which form corresponding passage holes through said perimeter side wall when separated from said perimeter side wall, for ingress and egress of a cat therethrough.

2. The cat cabinet of claim 1, wherein said end panels each having an upper rest inwardly extending into said housing, said top panel being rested on said upper rests.

3. The cat cabinet of claim 1, wherein said end panels each have a lower rest inwardly extending into said housing, wherein said lower rests are positioned between and spaced apart from said upper rests and said bottom panel, and wherein said shelf is rested on said lower rests.

4. The cat cabinet of claim 1, wherein said plurality of access doors comprises a pair of upper access doors positioned towards said upper edge of said perimeter side wall and a pair of lower access doors positioned towards said bottom panel.

5. The cat cabinet of claim 1, wherein said bottom panel has a plurality of ground engaging wheels mounted thereto.

6. The cat cabinet of claim 1, wherein each of said punchouts has an outer perimeter and a plurality of perforations through said perimeter side wall along said outer perimeter of the respective punchout for aiding separation of the respective punchout from said perimeter side wall.

7. The cat cabinet of claim 1, wherein each of said punchouts has an outer perimeter comprising a generally U-shaped lower portion and a substantially straight upper portion extending between spaced apart substantially straight side regions of said lower portion of the outer perimeter of the respective punchout, said lower portions of said outer perimeters of said punchouts each having a lower arcuate region having a convexity facing in a direction towards said bottom panel.

8. The cat cabinet of claim 1, wherein a second of said side panels has a plurality of mounting brackets coupled thereto, a first pair of said mounting brackets being outwardly extended from one of said end panels and a second pair of mounting brackets being outwardly extended from the other of said end panels.

9. A cat cabinet, comprising:
    a generally rectangular housing having a generally rectangular open top, a generally rectangular bottom panel and a perimeter side wall upwardly extending around said bottom panel;

said perimeter side wall comprising a spaced apart pair of generally rectangular end panels, and a spaced apart pair of generally rectangular side panels extending between said end panels;

said perimeter side wall having a generally rectangular upper edge defining said open top of said housing;

a generally rectangular top panel substantially covering said open top of said housing;

said end panels each having an upper rest inwardly extending into said housing;

said upper rests being positioned adjacently below said upper edge of said perimeter side wall;

said top panel being rested on said upper rests;

a substantially planar generally rectangular shelf being disposed in said housing and spaced above said bottom panel;

said shelf dividing said housing into upper and lower compartments, said upper compartment being defined between said top panel and said shelf, said lower compartment being defined between said bottom panel and said shelf;

said end panels each having a lower rest inwardly extending into said housing;

said lower rests being positioned between and spaced apart from said upper rests and said bottom panel;

said shelf being rested on said lower rests;

said shelf, said top panel, and said bottom panel lying in substantially parallel planes to one another;

said bottom panel having a plurality of ground engaging wheels mounted thereto;

a first of said side panels having a plurality of generally rectangular access doors pivotally coupled thereto to provide access into said housing through said first side panel;

said plurality of access doors comprising a pair of upper access doors positioned towards said upper edge of said perimeter side wall and a pair of lower access doors positioned towards said bottom panel;

said perimeter side wall having a plurality of removable punchouts which form corresponding passage holes through said perimeter side wall when separated from said perimeter side wall, for ingress ang egress of a cat therethrough;

said plurality of punchouts comprising a plurality of upper and lower punchouts;

said upper punchouts being positioned towards said upper edge of said perimeter side wall to provide access into said upper compartment when removed;

said lower punchouts being positioned towards said bottom panel to provide access into said lower compartment when removed;

each of said end panels having one of said upper punchouts and one of said lower punchouts located thereon;

a second of said side panels having at least two of said upper punchouts and at least two of said lower punchouts located thereon;

each of said punchouts having an outer perimeter and a plurality of perforations through said perimeter side wall along said outer perimeter of the respective punchout for aiding separation of the respective punchout from said perimeter side wall;

wherein said outer perimeter of each of said punchouts comprises a generally U-shaped lower portion and a substantially straight upper portion extending between spaced apart substantially straight side regions of said lower portion of the outer perimeter of the respective punchout;

said lower portions of said outer perimeters of said punchouts each having a lower arcuate region having a convexity facing in a direction towards said bottom panel;

said second side panel having a plurality of mounting brackets coupled thereto, a first pair of said mounting brackets being outwardly extended from one of said end panels and a second pair of mounting brackets being outwardly extended from the other of said end panels;

said mounting brackets each having a mounting hole therethrough; and a pair of litter boxes being disposed in said housing, one of said litter boxes being disposed in said upper compartment and resting on said shelf, the other of said litter boxes being disposed in said lower compartment and resting on said bottom panel.

* * * * *